United States Patent Office 2,733,391
Patented Jan. 31, 1956

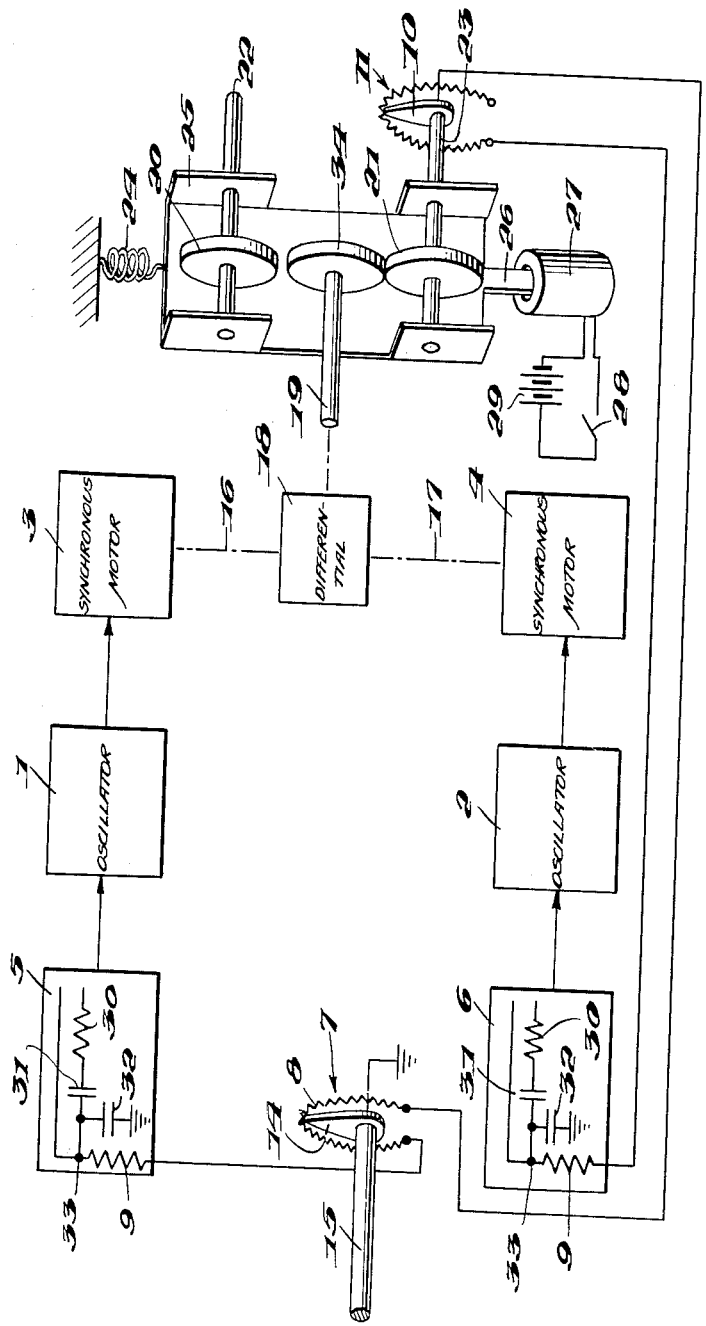

2,733,391

INTEGRATOR

Robert H. Mayer, Middle River, Md., assignor to The Glenn L. Martin Company, Middle River, Md., a corporation of Maryland Application April 26, 1952, Serial No. 284,660

6 Claims. (Cl. 318—28)

This invention relates to an electro-mechanical integrating device which will compute the time integral of a given function giving the result as an angular displacement of an output shaft, the value of the function being integrated being introduced into the integrator as an angular displacement of an input shaft.

It is an obvious characteristic of any rotation producing device, such as a motor, that the angular displacement of its rotating shaft is proportional to the time integral of the shaft's velocity. Therefore if the speed of a motor can be controlled by a variable control device so that the speed is proportional to the setting of the control device, the total angular displacement of the motor shaft during a given time interval will be proportional to the integral of a time function the value of which is represented by the setting of the control device.

This method of integrating, however, would be necessarily very inaccurate, since with any motor other than a synchronous motor, the relation between the speed of the motor and the setting of an associated control device would not be exact because of inertia effects, variable friction and windage losses, and other uncontrollable factors which would prevent an accurate linear relationship between the setting of the control device and the motor speed. A synchronous motor, however, will operate in exact synchronism with the frequency of its current supply, and if such a motor is connected to a source of supply such as an electronic oscillator, the frequency of which can be quite accurately controlled by varying the value of an element of the oscillator's frequency controlling network, reasonably accurate integration of a function whose value is represented by the setting of the variable element in the control circuit may be obtained provided there is a linear relationship between the setting of the variable element and the frequency of the oscillator output. In this system, however, the motor must be rotating at the start of and throughout the period of integration, since a synchronous motor is not self-starting and must be brought to synchronous speed by separate means before it will rotate in synchronism with the frequency of its current supply. Because of the obvious difficulty in measuring the shaft displacement under such circumstances, such a system would be impractical.

It is obviously desirable, therefore, to provide a system in which the velocity of the output shaft is zero for the control device setting which represents the zero value of the function to be integrated. This is accomplished in the proposed device by arranging a pair of synchronous motors so that the difference in their rotational velocities is proportional to the value of a function to be integrated. A differential connected to the shafts of the motors transforms this differential velocity into an output shaft rotation the velocity of which is proportional to the differential velocity. Thus the rotational displacement of the output shaft of the differential is proportional to the integral of the function.

It is the object of this invention to provide an electro-mechanical integrating system in which the angular displacement of an output shaft is proportional to the integral of a function, the value of which is represented by the angular displacement of an input shaft.

It is another object of this invention to provide an electro-mechanical integrator in which the output shaft velocity is zero for a zero value of the function being integrated.

It is a further object of this invention to provide an electro-mechanical integrator which includes means for automatically balancing the electrical circuits before the start of the integration.

These and further objects of the invention will become apparent from the following description taken in connection with the accompanying drawing.

In the drawing:

The figure is a diagrammatic view of the integrating system with certain of the elements shown in perspective to more clearly illustrate its operation.

As shown in the drawing, a pair of identical electronic oscillators 1 and 2 of the conventional Wien bridge type are connected respectively to a pair of hysteresis type synchronous motors 3 and 4 so that the speed of each motor is determined by the output frequency of its associated oscillator and is proportional thereto. The frequency controlling networks of the oscillators are represented in the drawing somewhat diagrammatically at 5 and 6.

A potentiometer 7 constitutes the variable element of each controlling network. The variable contact arm 14 of the potentiometer is mounted on the end of input shaft 15 and is grounded. Resistor 9 of network 5 is connected between point 33 and one end of the resistor element 8 of the potentiometer, and resistor 9 of network 6 is connected between similar point 33 of network 6 and the other end of the resistor element 8, through rheostat 11. Capacitor 32 of each network is connected between point 33 and ground. The movable contact arm 10 of rheostat 11 is mounted on shaft 23 so that rotation of the shaft will vary the value of resistance of the rheostat. Resistor 30 of each network is connected in series with capacitor 31 which is in turn connected to point 33 so that each network comprises a series parallel circuit, the resistance of the parallel portion of each being oppositely variable by rotation of input shaft 15. The resistance of the parallel portion of network 6 may be additionally varied by rotation of shaft 23.

Shafts 16 and 17 of motors 3 and 4 respectively are connected to a differential gear assembly 18 which is arranged so that its output shaft 19 rotates at a velocity proportional to the difference in velocities of shafts 16 and 17. A frame 25 carries the integrator output shaft 22 and nulling circuit shaft 23. A friction wheel 20 is fixed on shaft 22 and a second friction wheel 21 is fixed on the shaft 23 which, as previously described, carries contact arm 10 of rheostat 11 at its end. Friction wheel 34 carried at the outer end of differential output shaft 19 is mounted between wheels 20 and 21 so that either of the wheels may be engaged with wheel 34 by shifting the position of frame 25. A spring 24 attached to one end of frame 25 tends to move the frame so as to bring wheel 34 into contact with wheel 21. A projection 26 of the frame acts as the core of a solenoid 27 so that when switch 28 is closed, battery 29 energizes the coil of the solenoid and draws the projection 26 into the coil, thus moving the frame 25 so that wheel 20 is brought into contact with wheel 34, simultaneously disengaging wheel 21.

In operation, shaft 15 is positioned at an arbitrary reference point which represents the zero value of the function to be integrated, the reference position selected preferably being such that approximately equal values of resistance are introduced into control networks 5 and 6 by potentiometer 7. With switch 28 open, spring 24 will exert a force on frame 25, thereby holding friction wheels 21 and 34 in engagement. Any difference in rotational velocities of the synchronous motors 3 and 4 will produce a rotation of differential output shaft 19 which will be transmitted through wheels 34 and 21 to shaft 23, rotating contact arm 10 so as to change the amount of resistance introduced into control circuit 6 by rheostat 11. Shaft 19 will continue to rotate until the resistance introduced into control circuit 6 has caused the output frequency of oscillator 2 to change to exactly equal the output frequency of oscillator 1, thus equalizing the speeds of motors 3 and 4 so that the rotational velocity of shaft 24 is then zero and the system is balanced.

To begin the integrating operation, switch 28 is closed, energizing the solenoid 27 and moving the frame 25 so as to disengage friction wheels 21 and 24 and bring wheel 34 into engagement with wheel 20. As previously pointed out, integrator input shaft 15 is arranged so that its angular displacement from the aforementioned reference position is at any time proportional to the value of the function being integrated. Therefore, any subsequent rotation of shaft 15 from the reference position will move potentiometer arm 14 so that the value of the resistance in the control circuits 5 and 6 will be varied oppositely, thereby simultaneously increasing the frequency of one of the oscillators while decreasing that of the other. It can be shown that with the control network described, the frequency of each oscillator will at any time be equal to $$\frac{1}{2\pi\sqrt{R_1R_2C_1C_2}}$$

so that the difference between the oscillator frequencies will be $$\frac{1}{2\pi\sqrt{R_1R_2C_1C_2}}\left(\frac{1}{\sqrt{1-.01K}}-\frac{1}{\sqrt{1+.01K}}\right)$$

where:

$R_1$ = value of resistor 30
$R_2$ = combined value of resistor 9 and the value of resistance introduced into the control circuit by potentiometer 7 (and rheostat 11 in the case of oscillator 2)
$C_1$ = value of capacitor 31
$C_2$ = value of capacitor 32
$K$ = percentage change of $R_2$ as contact arm 14 is rotated For small frequency changes potentiometer 7 may be a linear potentiometer and excellent linearity between input shaft rotation and oscillator difference frequency will result. Since the synchronous motors 3 and 4 rotate with velocities proportional to the output frequencies of oscillators 1 and 2 respectively, and the differential output shaft 19 rotates at a velocity proportional to the difference in velocities of the motors, the velocity of the shaft 19 is proportional to the difference in oscillator frequencies and consequently to the input shaft position. Therefore the angular position of the output shaft 22 with respect to its starting position will be proportional to the time integral of the function being integrated, the value of which is represented by the angular displacement of the input shaft 15 with respect to its reference position. Thus the device described will integrate any time function whose value can be continuously represented by the angular displacement of the input shaft 15, the result being represented by the angular displacement of output shaft 22.

It is to be understood that the invention herein described is not confined to the precise details of construction set forth, as it is apparent that many changes and variations may be made without departing from the scope of the invention as defined by the appended claims, and no limitation is intended by the phraseology of the foregoing description or the illustrations in the accompanying drawings.

I claim as my invention:

1. An integrator having an input shaft, a pair of variable frequency generators, a synchronous motor connected to each of said generators, a differential connected to said motors and having an output shaft adapted to rotate at a velocity proportional to the difference in frequency of said generators, and means responsive to rotational movement of said input shaft for oppositely varying the frequencies of said generators substantially in proportion to the extent of said movement.

2. An integrator comprising an input shaft, a pair of electronic oscillators having frequency controlling networks including a potentiometer responsive to angular displacement of said shaft from a reference position to oppositely vary the resistance of a portion of said frequency controlling circuits of said oscillators to thereby oppositely vary the frequencies thereof by an amount proportional to the angular displacement of said shaft, a synchronous motor connected to each of said oscillators, and a gear type differential connected to the shafts of said motors and having an output shaft adapted to rotate at a velocity proportional to the difference in frequency of said generators.

3. An integrator having an input shaft, a pair of variable frequency generators, a synchronous motor connected to each of said generators, a differential connected to said motors and having an output shaft adapted to rotate at a velocity proportional to the difference in frequency of said generators, means responsive to rotational movement of said input shaft for oppositely varying the frequencies of said generators substantially in proportion to the extent of said movement, and nulling means controlled by said output shaft and responsive to movement thereof for initially equalizing the frequencies of said generators for a predetermined position of said input shaft, and means for disconnecting said nulling means from control by said output shaft whereby subsequent angular movement of said output shaft will be proportional to the time integral of the instantaneous deviation of said input shaft from said predetermined position.

4. An integrator comprising an input shaft, a pair of electronic oscillators, a synchronous motor connected to each of said oscillators, a gear type differential connected to the shafts of said motors and having an output shaft adapted to rotate at a velocity proportional to the difference in frequency of said generators, each of said oscillators having a frequency controlling network including a potentiometer responsive to angular displacement of said input shaft from a reference position to oppositely vary the resistance of said frequency controlling circuits of said oscillators and thereby to oppositely vary the frequencies thereof by an amount proportional to the angular displacement of said shaft, and a rheostat operatively controlled by said output shaft and responsive to the initial rotation of said output shaft for varying the resistance of a portion of the circuit of one of said oscillators to initially equalize the frequencies of said oscillators, and means for disconnecting said rheostat from control by said output shaft whereby subsequent angular rotation of said output shaft will be proportional to the time integral of the instantaneous deviation of said input shaft from said predetermined position.

5. An integrator comprising an input shaft, a pair of electronic oscillators, a synchronous motor connected to each of said oscillators, a gear type differential connected to the shafts of said motors and having an output shaft adapted to rotate at a velocity proportional to the difference in frequency of said generators, each of said oscillators having a frequency controlling network including a potentiometer responsive to angular displacement of said input shaft from a reference position to oppositely vary the resistance of said frequency controlling circuits of said oscillators and thereby to oppositely vary the frequencies thereof by an amount proportional to the angular displacement of said shaft, a frequency balancing shaft selectively engageable with said output shaft, a rheostat responsive to any rotation of said balancing shaft for varying the resistance of the frequency controlling circuit of one of said oscillators to equalize the output frequencies of said oscillators, and means for selectively engaging and disengaging said frequency balancing shaft with said output shaft.

6. An integrator comprising an input shaft, a pair of electronic oscillators, a synchronous motor connected to each of said oscillators, a gear type differential connected to the shafts of said motors and having an output shaft adapted to rotate at a velocity proportional to the difference in frequency of said generators, each of said oscillators having a frequency controlling circuit including a potentiometer responsive to angular displacement of said input shaft from a reference position to oppositely vary the resistance of a portion of the circuits of said oscillators and thereby to oppositely vary the frequencies thereof by an amount proportional to the angular displacement of said shaft, a movable frame, a pair of shafts rotatably mounted in said frame, a rheostat included in one of said frequency controlling networks and responsive to any rotation of one of said pair of shafts for varying the resistance of a portion of said frequency controlling network to initially equalize the frequencies of said oscillators, and means for moving said frame so as to selectively engage either of said pair of shafts with said output shaft.

References Cited in the file of this patent

UNITED STATES PATENTS

| | | |
|---|---|---|
| 1,907,132 | Thurston | May 2, 1933 |
| 2,387,795 | Isserstedt | Oct. 30, 1945 |
| 2,411,147 | Cooley | Nov. 19, 1946 |
| 2,429,427 | Reiber | Oct. 21, 1947 |
| 2,436,582 | Lear | Feb. 24, 1948 |
| 2,607,828 | Razek | Aug. 19, 1952 |